United States Patent
Choi (10) Patent No.: US 10,200,896 B2
(45) Date of Patent: Feb. 5, 2019

(54) SYSTEMS AND METHODS FOR PERFORMING MEASUREMENTS IN TRANSMISSION GAPS

(71) Applicant: INTEL DEUTSCHLAND GMBH, Neubiberg (DE)

(72) Inventor: Hyung-Nam Choi, Hamburg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 15/428,492

(22) Filed: Feb. 9, 2017

(65) Prior Publication Data
US 2017/0156074 A1  Jun. 1, 2017

Related U.S. Application Data

(63) Continuation of application No. 14/702,222, filed on May 1, 2015, now Pat. No. 9,603,043, which is a
(Continued)

(51) Int. Cl.
*H04W 24/08* (2009.01)
*H04W 24/10* (2009.01)
*H04W 72/04* (2009.01)

(52) U.S. Cl.
CPC ........... *H04W 24/08* (2013.01); *H04W 24/10* (2013.01); *H04W 72/0446* (2013.01)

(58) Field of Classification Search
CPC ............. H04W 24/08; H04W 72/0446; H04W 72/0453; H04W 72/1205; H04W 72/1278;
(Continued)

(56) References Cited

U.S. PATENT DOCUMENTS 6,694,135 B1   2/2004   Oksala et al.
6,810,019 B2   10/2004  Steudle
(Continued)

FOREIGN PATENT DOCUMENTS

CN    1406446 A    3/2003
CN    101772927 A  7/2010
(Continued)

OTHER PUBLICATIONS

3GPP TS 34.108 V6.5.0 (Dec. 2006); Technical Specification; 3rd Generation Partnership Project; Technical Specification Group Radio Access Network; Common Test Environments for User Equipment (UE); Conformance Testing (Release 6).
(Continued)

*Primary Examiner* — Meless Zewdu
(74) *Attorney, Agent, or Firm* — Schwabe, Williamson & Wyatt, P.C.

(57) ABSTRACT

A method for performing a measurement by a communication device including selecting at least one measurement type of a plurality of measurement types, wherein each measurement type is assigned to a time slot, wherein the at least one measurement type is selected for a time interval which is pre-defined as a transmission gap of a receiver of the communication device for carrying out measurements by the receiver corresponding to the time slot; and performing a measurement of the at least one measurement type during the time interval.

25 Claims, 3 Drawing Sheets

Related U.S. Application Data continuation of application No. 11/835,192, filed on Aug. 7, 2007, now Pat. No. 9,271,174.

(58) Field of Classification Search
CPC ..... H04W 72/04; H04W 24/10; H04W 24/00; H04W 24/02; H04W 24/04; H04W 72/02; H04W 72/044; H04W 72/0473; H04W 72/1231; H04W 88/02; H04W 88/08

See application file for complete search history.

(56) References Cited

U.S. PATENT DOCUMENTS

| | | | |
|---|---|---|---|
| 7,330,732 | B2 | 2/2008 | Wilborn et al. |
| 8,391,244 | B2 * | 3/2013 | Choi ................ H04W 36/0088 370/332 |
| 9,271,174 | B2 * | 2/2016 | Choi ...................... H04W 24/10 |
| 9,603,043 | B2 * | 3/2017 | Choi ...................... H04W 24/10 |
| 2001/0022782 | A1 * | 9/2001 | Steudle ................ H04W 24/10 370/335 |
| 2002/0006119 | A1 * | 1/2002 | Steudle ............ H04W 36/0088 370/329 |
| 2005/0250495 | A1 | 11/2005 | Black et al. |
| 2006/0223557 | A1 * | 10/2006 | Manohar .......... H04W 36/0088 455/502 |
| 2007/0037594 | A1 | 2/2007 | Palenius et al. |
| 2007/0037601 | A1 | 2/2007 | Mittal et al. |
| 2007/0207824 | A1 | 9/2007 | Bhattacharjee et al. |
| 2008/0189970 | A1 * | 8/2008 | Wang ................ H04W 36/0055 33/701 |
| 2008/0274742 | A1 * | 11/2008 | Bi ..................... H04W 36/0088 455/437 |
| 2009/0022062 | A1 * | 1/2009 | Wang ................ H04W 36/0066 370/252 |
| 2009/0042559 | A1 | 2/2009 | Choi |
| 2010/0040037 | A1 | 2/2010 | Choi et al. |
| 2012/0307670 | A1 | 12/2012 | Kazmi et al. |
| 2015/0085754 | A1 | 3/2015 | Su et al. |

FOREIGN PATENT DOCUMENTS

| | | |
|---|---|---|
| CN | 103002503 | 3/2013 |
| DE | 10225912 A1 | 11/2003 |
| EP | 2176994 | 4/2010 |
| KR | 10-2010-0030670 B1 | 1/2013 |
| WO | 2006107966 A1 | 10/2006 |
| WO | 2009019129 | 2/2009 |

OTHER PUBLICATIONS

3GPP TS 25.215 V3.13.0 (Mar. 2005); Technical Specification; 3rd Generation Partnership Project; Technical Specification Group Radio Access Network; Physical Layer—Measurements (FDD) (Release 1999).

South Korean Patent Office; Office Action for South Korean App. No. 2010-7002606 dated Apr. 16, 2012; 7 pages inclusive of English translation.

South Korean Patent Office; Office Action for South Korean App. No. 2010-7002606 dated Apr. 7, 2011; 11 pages inclusive of English translation.

European Patent Office; International Search Report and Written Opinion for PCT App. No. PCT/EP2008/059567 dated Dec. 1, 2008; 12 pages.

International Bureau of WIPO; International Preliminary Report on Patentability for PCT App. No. PCT/EP2008/059567 dated Feb. 18, 2010; 8 pages.

Chinese Patent Office; First Office Action for Chinese App. No. 200880101717.8 dated Feb. 3, 2012; 10 pages of English translation.

European Patent Office; Examination Report for European App. No. 08786303.1 dated Jun. 28, 2012; 4 pages.

Chinese Patent Office; First Office Action for Chinese App. No. 201310014007.4 dated Sep. 15, 2014; 25 pages inclusive of English translation.

Indian Patent Office; First Examination Report; Indian App. No. 206/KOLNP/2010 dated Dec. 11, 2014; 1 page.

United States Patent and Trademark Office; Office Action for U.S. Appl. No. 11/835,192 dated Jun. 21, 2010; 13 pages.

United States Patent and Trademark Office; Office Action for U.S. Appl. No. 11/835,192 dated Feb. 23, 2011; 9 pages.

United States Patent and Trademark Office; Office Action for U.S. Appl. No. 11/835,192 dated Oct. 27, 2011; 12 pages.

United States Patent and Trademark Office; Office action for U.S. Appl. No. 11/835,192 dated May 7, 2012; 10 pages.

Chinese Patent Office; Second Office Action for Chinese App. No. 201310014007.4 dated Apr. 14, 2015; 18 pages inclusive of English translation.

Chinese Patent Office; Third Office Action for Chinese App. No. 201310014007.4 dated Jul. 28, 2014; 12 pages inclusive of English translation.

* cited by examiner

FIG 1

SYSTEMS AND METHODS FOR PERFORMING MEASUREMENTS IN TRANSMISSION GAPS

CROSS REFERENCE TO RELATED APPLICATION

This application is a continuation of U.S. patent application Ser. No. 14/702,222 filed on May 1, 2015 now U.S. Pat. No. 9,603,043, which is a continuation of U.S. patent application Ser. No. 11/835,192 filed on Aug. 7, 2007 now U.S. Pat. No. 9,271,174, the content and disclosure of both of which are hereby incorporated by reference in their entireties.

BACKGROUND

Embodiments of the invention relate generally to a method for performing a measurement by a communication device and a communication device.

BRIEF DESCRIPTION OF THE DRAWINGS

In the drawings, like reference characters generally refer to the same parts throughout the different views. The drawings are not necessarily to scale, emphasis instead being placed upon illustrating the principles of the invention. In the following description, various embodiments of the invention are described with reference to the following drawings, in which.

DESCRIPTION

In the current UMTS mobile radio communication standard (Universal Mobile Telecommunications Systems communications standard), also called Release 7, a maximum net transmission rate of 28.8 Mbps is supported in the downlink transmission direction and of 11.52 Mbps is supported in the uplink transmission direction. The uplink transmission direction, also called the uplink, denotes signal transmission from the mobile radio communication terminal to the respective UMTS base station. The downlink transmission direction also called the downlink, denotes signal transmission from the respective associated UMTS base station to the mobile radio communication terminal. Radio transmission technologies currently specified are Frequency Division Duplex (FDD) and Time Division Duplex (TDD). The multiple access method used is based on Code Division Multiple Access (CDMA) technology.

A current topic in the 3GPP standardization committees (3GPP: 3rd Generation Partnership Project) is the further development of UMTS towards a mobile radio communication system optimized for packet data transmission by improving the system capacity and by improving the spectral efficiency. In 3GPP, the activities in this regard are summarized under the general term LTE for Long Term Evolution. The aim is amongst others to increase the maximum net transmission rate significantly in future, namely to 100 Mbps in the downlink transmission direction and to 50 Mbps in the uplink transmission direction. To improve transmission via the air interface, new multiple access methods have inter alia been specified.

For the downlink transmission direction OFDMA (Orthogonal Frequency Division Multiple Access) in combination with TDMA (Time Division Multiple Access) has been specified. OFDMA in combination with TDMA, subsequently also called OFDMA/TDMA, is a multicarrier multiple access method in which a subscriber is provided with a defined number of subcarriers in the frequency spectrum and a defined transmission time for the purpose of data transmission.

Uplink data transmission is based on SC-FDMA (Single Carrier Frequency Division Multiple Access) in combination with TDMA.

In the UMTS FDD mode according to Release 7, the so-called compressed mode is specified to give a mobile terminal (also denoted as user equipment, UE, in UMTS) which, e.g. for saving costs, only includes one receiver, the opportunity to carry out inter frequency measurements, i.e. measurements of the reception quality of UMTS radio cells which are operated using a different frequency band than the radio cell in which the mobile terminal is currently located, and inter-RAT (radio access technology) measurements, i.e. measurements of the reception quality of radio cells of a mobile communication system operated according to a different radio access technology, for example a GSM (Global System for Mobile Communications) mobile communication system. According to compressed mode, transmission gaps in the uplink transmission and/or the downlink transmission are specified which can be used by a mobile terminal to carry out such measurements.

In the case of downlink, for example, the base station (also denoted by NodeB) temporarily suspends the data transmission to the mobile terminal for the duration of the specified (downlink) transmission gaps. In the case of uplink, the mobile terminal temporarily suspends the data transmission to the base station for the duration of the specified (uplink) transmission gaps.

This is explained in more detail in the following with reference to FIG. 1.

Figure 1:
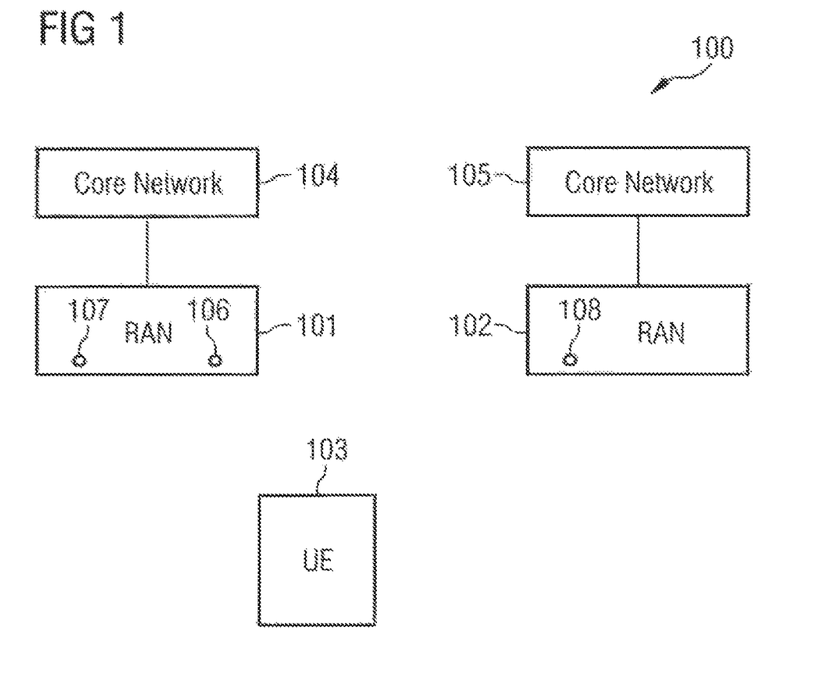
FIG. 1 shows a communication system according to an embodiment of the invention.

FIG. 1 shows a communication system 100 according to an embodiment of the invention.

The communication system 100 includes a first radio access network 101, a second radio access network 102 and a mobile terminal 103. The first radio access network 101 is for example the radio access network of a UMTS communication network, also denoted as UTRAN (UMTS Terrestrial Radio Access Network) and is coupled with a first core network 104 of the UMTS communication network. The second radio access network 102 is in this example a radio access network according to another radio access technology than the one according to UMTS, for example the radio access network of a mobile communication network according to GSM, FOMA (Freedom of Mobile Access) or CDMA2000 (CDMA: Code Division Multiple Access), which includes a second core network 105 to which the second radio access network 102 is coupled. It is assumed that the mobile terminal 103 is located in a radio cell operated by a first base station 106 of the first radio access network 101. The mobile terminal 103 may receive data sent by the first base station 106 (i.e. in downlink) and may send data to the first base station 106 (i.e. in uplink).

The mobile terminal 103 may carry out measurements of the reception quality of other radio cells of the first radio access network 101, for example of a radio cell neighbouring the radio cell in which the mobile terminal 103 is located and operated by a second base station 107 of the first radio access network 101. The measurement of the reception quality in the radio cell operated by the second base station 107, i.e. the reception quality of data sent by the second base station 107, is for example an inter frequency measurement, i.e. the radio cell operated by the second base station 107 is operated in another frequency band than the radio cell in which the mobile terminal 103 is located, i.e. for data transmission to and from the second base station 107 a different frequency band is used than for data transmission to and from the first base station 106.

The mobile terminal 103 may also carry out measurements of the reception quality (e.g. the signal to noise ratio) of radio cells operated by the second radio access network 102, for example in the radio cell operated by a third base station 108 of the second radio access network 102. Since in this example, the second radio access network 102 uses a different radio access technology than the first radio access network 101 the measurement of the reception quality in the radio cell operated by the third base station 108 is an inter RAT measurement.

define corresponding compressed mode parameters which are signalled by the first base station 106 to the mobile terminal 103. The compressed mode parameters for example specify the length of each transmission gap TGL (transmission gap length), the time difference between the beginnings of two transmission gaps TGD (transmission gap start distance) and the duration of the usage of the transmission gaps TGPL (transmission gap pattern length).

Measurements of a multiplicity of inter frequency measurement types and inter RAT measurement types may by carried out by the mobile terminal 103. For each measurement type individual compressed mode parameters may be defined. This means that for each measurement type, an individual transmission gap pattern may be defined. A measurement of a certain measurement type may only be carried out in a transmission gap defined for this measurement type. The transmission gap patterns such that transmission gaps defined for different measurement types do not overlap. As an example, in table 1 the configuration of compressed mode parameters for one inter frequency measurement type and three inter RAT measurement types are shown.

TABLE 1

| Parameter | Inter-Frequency FDD | GSM Carrier RSSI | GSM Initial BSIC identification | GSM BSIC reconfirmation |
|---|---|---|---|---|
| TGSN (Transmission Gap Starting Slot Number) | 8 | 8 | 8 | 8 |
| TGL1 (Transmission Gap Length 1) | 14 | 14 | 14 | 14 |
| TGL2 (Transmission Gap Length 2) | 14 | 14 | 14 | 14 |
| TGD (Transmission Gap Distance) | 0 | 60 | 45 | 0 |
| TGPL1 (Transmission Gap Pattern Length) | 12 | 24 | 24 | 24 |
| TGPL2 (Transmission Gap Pattern Length) | — | — | — | — |
| TGCFN (Transmission Gap Connection Frame Number): | (Current CFN + (238 − TTI/10 msec)) mod 256 | (Current CFN + (242 − TTI/10 msec)) mod 256 | (Current CFN + (256 − TTI/10 msec)) mod 256 | (Current CFN + (253 − TTI/10 msec)) mod 256 |
| UL/DL compressed mode selection | DL, UL or DL & UL | DL, UL or DL & UL | DL, UL or DL & UL | DL, UL or DL & UL |
| UL compressed mode method | SF/2 | SF/2 | SF/2 | SF/2 |
| DL compressed mode method | SF/2 | SF/2 | SF/2 | SF/2 |

Reception quality for example means the received power of one or more predefined signals (Reference Signal Received Power, RSRP) or a ratio of the received power of one or more predefined signals and the received interfering power (or power of the noise) received in the same frequency band as the predefined signals (Reference Signal Received Quality, RSRQ).

For carrying out inter frequency measurements or inter RAT measurements there may be specified transmission gaps based on the CDMA multiple access method according to the feature compressed mode. Compressed mode is a special feature of the UMTS FDD mode for generation of transmission gaps of uplink data transmission and downlink data transmission in the RRC (radio resource control) state CELL DCH. When the mobile terminal 103 is in the state CELL DCH dedicated radio resources are allocated by the first radio access network 101 for the mobile terminal 103 for data transmission between the first base station 106 and the mobile terminal 103.

When measurements need to be carried out using the compressed mode the first radio access network 101 may Note that herein, the term measurement refers to an individual measurement which is carried out at some measurement time. A measurement is of a certain measurement type. For example, performing out a measurement according to a measurement type at a measurement time, e.g. during a measurement time interval, means that the reception power is measured in a radio cell at the measurement time. In this case the measurement type would for example be "measurement of the reception power in the radio cell". A measurement type may be an inter frequency measurement type, i.e. measurements of the measurement type are inter frequency measurements, or it may be an inter RAT measurement type, i.e. measurements of the measurement type are inter RAT measurements.

Figure 2:
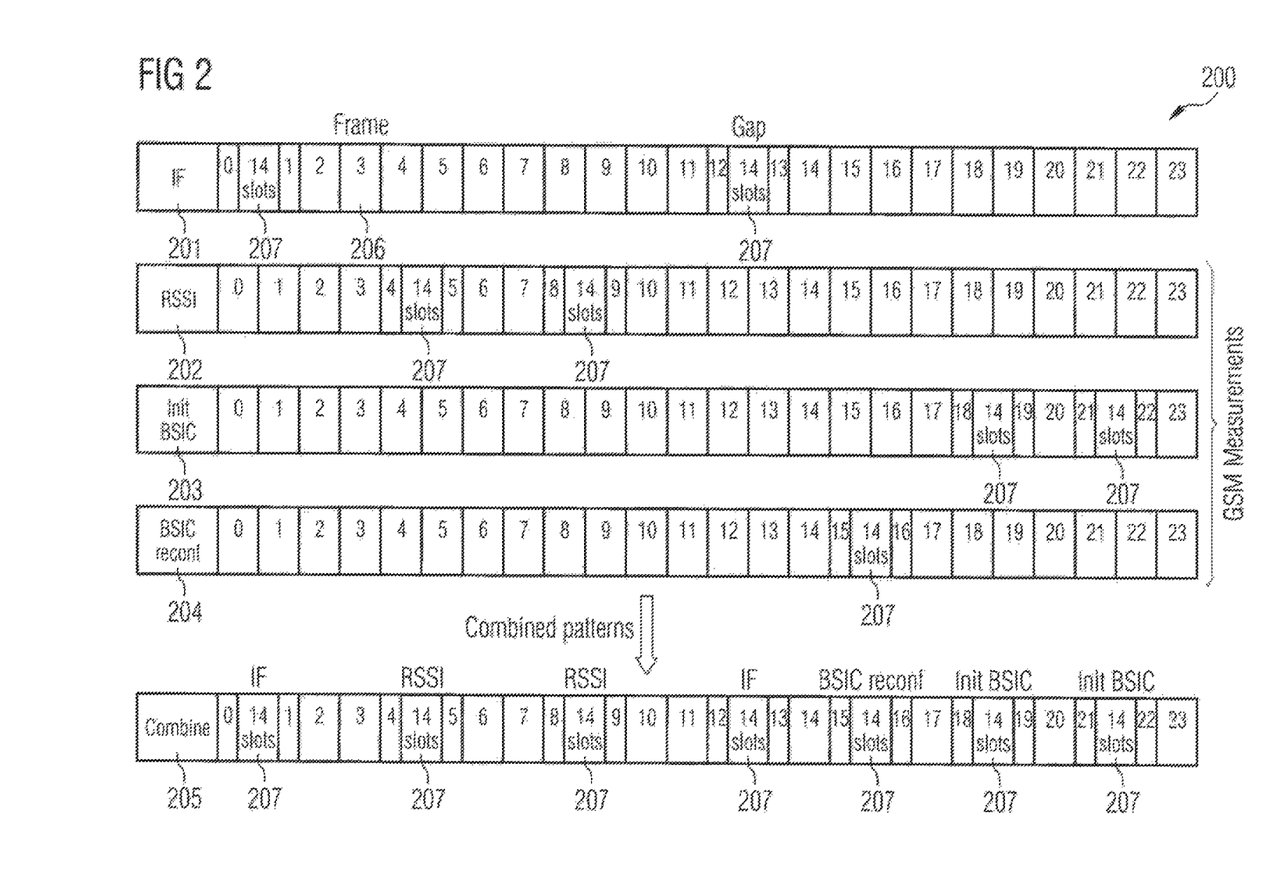
FIG. 2 shows transmission gap patterns for carrying out inter frequency and inter RAT measurements.

In FIG. 2, transmission gap patterns for the four measurement types referred to in table 1 are shown.

FIG. 2 shows transmission gap patterns for carrying out inter frequency and inter RAT measurements.

A first transmission gap pattern 201 is the transmission gap pattern of an inter frequency measurement type. A second transmission gap pattern 202 is the transmission gap pattern of an inter RAT measurement type. In this example the received signal strength indicator (RSSI) of a GSM frequency carrier is measured.

A third transmission gap pattern 203 is the transmission gap pattern of an inter RAT measurement type. In this example, the reception quality of a frequency channel and a synchronization channel of GSM radio cells is measured.

A fourth transmission gap pattern 204 is the transmission gap pattern for carrying out measurements of an inter RAT measurement type, in this example the reception quality of the synchronisation channel of GSM radio cells is measured.

There is further shown a fifth transmission gap pattern 205 which includes all the transmission gaps defined according to the first transmission gap pattern 201, the second transmission gap pattern 202, the third transmission gap pattern 203, and the fourth transmission gap pattern 204.

The transmission gap patterns 201 to 205 are illustrated in the form of a plurality of a radio frame 206, in this example 24 radio frames (numbered from 0 to 23). The transmission gaps 207 defined for the respective transmission gap patterns include at least parts of the radio frames 206. The structure of the radio frame 206 is shown in more detail in FIG. 3.

Figure 3:
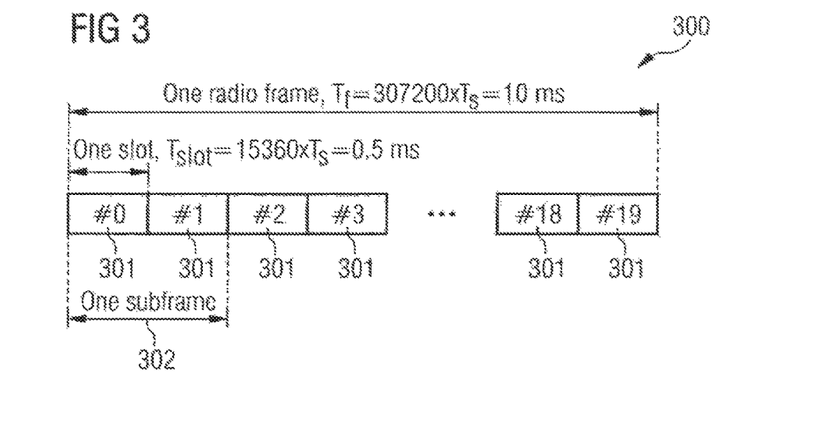
FIG. 3 shows a radio frame structure according to an embodiment of the invention.

FIG. 3 shows a radio frame structure according to an embodiment of the invention.

According to the radio frame structure shown, a radio frame 300 has a length of 10 ms and includes 20 time slots 301 each of length 0.5 ms. Every two times slots 301 may be grouped to one sub frame 302 such that the radio frame 300 includes 10 sub frames of length 1 ms.

The lengths of time slots 301, radio frames 300 and sub frames may be different from those given above in other embodiments. Further, in other embodiments, a radio frame includes not 20 time slots 301 but for example 15 time slots 301.

In the example of transmission gap patterns shown in FIG. 2, each transmission gap includes 14 time slots 301.

It can be seen that when transmission gap patterns are specified for a plurality of measurement types a lot of transmission gaps are generated altogether, such as in the combined transmission gap pattern 205, the transmission gaps defined for the various measurement types do not overlap. This means that there are relatively many transmission gaps which can not be used for data transmission between the first base station 106 and the mobile terminal 103. This effect is intensified with a high number of possible measurement types such as it is the case according to LTE because according to LTE there is a high number of inter RAT measurements due to the fact that a UMTS communication network according to LTE shall support not only inter working with GSM communication networks, i.e. the possibility for mobile terminals to use radio access networks according to GSM, but also with UMTS radio access networks based on CDMA, radio access networks based on mobile WiMAX and radio access networks according to 3GPP 2 (i.e. CDMA 2000).

Therefore, according to one embodiment of the invention, a method for performing a measurement by a communication device is provided, for example to be applied to the communication system described with reference to FIG. 1, in which case the communication device may correspond to the mobile terminal 103, which is for example a UMTS mobile terminal according to LTE.

Figure 4:
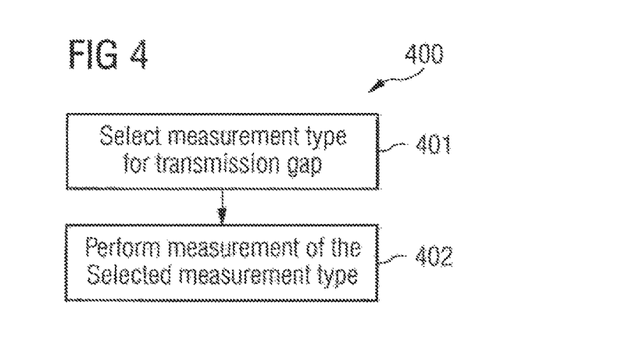
FIG. 4 shows a flow diagram according to an embodiment of the invention.

FIG. 4 shows a flow diagram 400 according to an embodiment of the invention.

The flow diagram 400 illustrates a method for performing a measurement by a communication device according to an embodiment of the invention.

In 401, at least one measurement type of a plurality of measurement types is selected, wherein each measurement type is assigned to a time slot, wherein the at least one measurement type is selected for a time interval which is pre-defined as a transmission gap of a receiver of the communication device for carrying out measurements by the receiver corresponding to the time slot.

In 402, a measurement of the at least one measurement type is performed during the time interval.

The time slot does not need to correspond to a time slot of a frame structure as shown in FIG. 3, but may include more than one time slots of a frame or more than one subframe. It may also include time slots of adjacent radio frames.

Illustratively, according to one embodiment, one transmission gap may be specified for a plurality of measurement types and a communication device may select the measurement type of the plurality of measurement types according to which a measurement is actually performed. In other words, the transmission gaps for different measurement types may overlap, fully or partly. In this way, especially if there are a lot of measurement types, the number of transmission gaps defined may be reduced and the impact on the radio resources can be reduced, i.e. radio resources can be used for actual (useful) data transmission for a larger time period. Thus, for example, the delay of (useful) data transmissions may be reduced. In one embodiment, illustratively, a mobile device is provided with means to carry out measurements efficiently.

In one embodiment, the method illustrated in FIG. 4 further includes receiving a message specifying the assignment of the measurements types to the time slot.

Each measurement type may be assigned a priority and the at least one measurement type is for example selected based on the priorities of the measurement types.

In one embodiment, each measurement type is assigned a counter counting the number of measurements performed according to the measurement type and the at least one measurement type is selected based on the current values of the counters of the measurement types.

The communication device is for example a mobile terminal, e.g. a mobile terminal according to UMTS.

In one embodiment, the measurement is the measurement of the reception quality of a signal sent by a base station in a radio cell. For example, the measurement is the measurement of the reception field strength of a signal sent by a base station in a radio cell, e.g. a radio cell of a UMTS mobile communication system.

A memory used in the embodiments of the invention may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g. , a floating gate memory, a charge trapping memory, an MRAM (Magnetoresistive Random Access Memory) or a PCRAM (Phase Change Random Access Memory).

A circuit can be a hardware circuit, e.g. an integrated circuit, designed for the respective functionality or also a programmable unit, such as a processor, programmed for the respective functionality.

In one embodiment of the invention, to reduce the transmission time lost due to transmission gaps, i.e. to increase the time which can be used for data transmission between the first base station 106 and the mobile terminal 103, transmission gap patterns for different measurement types are defined in such a way that the transmission gaps of different measurements overlap. Further, according to an embodiment of the invention, for each measurement type the following parameters are specified:

- a counter counting the number of measurements according to the measurement type that have been performed;
- a parameter specifying the minimum number of measurements of the measurement type to be performed before reporting them to the base station;
- a parameter specifying the relative priority of the measurement type, for example in the range of 1 to 8, in which the priority 1 specifies the highest priority and the priority 8 specifies the lowest priority.

The mobile terminal 103 carries out measurements of the measurement types using these parameters according to the following rules:

After each measurement of a measurement type the counter counting the number of measurements according to the measurement type that have been carried out, i.e. performed, is increased by the integer value 1. When the results of the measurements (e.g performed since the previous reporting) of the measurement type are reported to the base station 103, the counter is reset to a default value, for example 0.

When a transmission gap is specified for more than one measurement type, the mobile terminal 103 selects the measurement type of which a measurement is carried out during the transmission gap based on the counter counting the number of measurements according to the measurement type carried out, the minimum number of measurements according to the measurement type to be carried out before reporting and the relative priority of the measurement type. For example, this is done according to the following rule: A measurement of the measurement type which has the highest relative priority is selected to be carried out, or, in the case that more than one measurement type for which the transmission gap is specified have the highest priority, a measurement type is selected for which the counter counting the number of measurements carried out is smaller than the minimum number of measurements to be carried out before reporting.

The mobile terminal 103 only reports the measurements of that measurement type, i.e. the results of measurements of that measurement type, to the first base station 106, for which the counter counting the number of the measurements carried out is equal or higher than the minimum number of measurements to be carried out before reporting.

The parameter specifying the minimum number of measurements to be carried out before reporting and the relative priority of the measurement type are for example signalled by the first radio access network 101 to the mobile terminal 103, for example via a system information broadcast, or is signalled in course of the establishment of a dedicated communication connection between the mobile terminal 103 and the first base station 106.

An example for the performing of measurements according to an embodiment of the invention is explained in the following with reference to FIG. 5.

Figure 5:
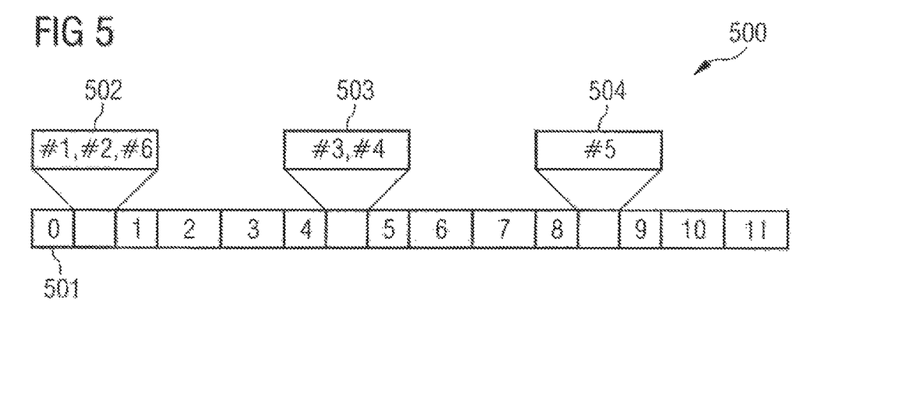
FIG. 5 shows a transmission gap pattern according to an embodiment of the invention.

FIG. 5 shows a transmission gap pattern 500 according to an embodiment of the invention.

As above, the transmission gap pattern 500 is illustrated in the form of a plurality of radio frames 501, in this example in the form of a periodic frame cycle consisting of 12 radio frames 501 numbered from 0 to 11. For example, a radio frame 501 has the structure as shown in FIG. 3 according to the LTE radio frame structure. Other frame structures are possible.

In this embodiment, the first radio access network 101, for example an UMTS radio access network according to LTE, has configured parameters for the mobile terminal 103 for six types of measurements including inter frequency measurements as well as inter RAT measurements:

Type 1: Inter frequency LTE FDD: According to this measurement type, the reception power and/or reception quality of reference signals of different radio cells operated by the first radio access network 101 than the one operated by the first base station 106 is measured, for example the reference signals transmitted by the second base station 107.

Type 2: Inter RAT UMTS CDMA FDD: The reception power and/or reception energy of the common pilot channel of the radio cells operated by a radio access network according to UMTS CDMA FDD are measured.

Type 3: Inter RAT GSM carrier RSSI: The received signal strength indicator (RSSI) of a GSM frequency carrier in a radio cell operated by a GSM radio access network, for example operated by the third base station 108 is measured.

Type 4: Inter RAT GSM initial BSIC identification: The reception power and/or reception quality of the frequency channel and the synchronisation channel of radio cells operated by a GSM radio access network, for example operated by the third base station 108, are measured.

Type 5: Inter RAT GSM BSIC re-confirmation: The reception power and/or reception quality of the synchronisation channel of a radio cell operated by a GSM radio access network, for example operated by the third base station 108, are measured.

Type 6: Inter RAT mobile WiMAX: The reception power and/or reception quality of the reference signal of radio cells operated according to a mobile WiMAX radio access network are measured.

In this example, it is assumed that the first radio access network 101 is operated in UMTS LTE FDD mode.

For each of the configured measurements the following parameters are specified the number of single measurements carried out ($N$mess);

transmission gap length (TGL);

the minimum number of single measurements to be carried out before reporting ($N$mess_min);

the relative priority of the measurement.

Examples for the values of the parameters TGL, $N$mess_min and the (relative) priority are shown for the six measurement types in table 2.

TABLE 2

| Parameter | Inter-Frequency FDD | UMTS CDMA FDD | GSM Carrier RSSI | GSM Initial BSIC identification | GSM BSIC re-confirmation | Mobile WiMAX |
|---|---|---|---|---|---|---|
| TGL (slots) | 14 | 8 | 14 | 14 | 14 | 10 |
| $N_{Mess\_Min}$ | 4 | 4 | 4 | 4 | 4 | 4 |
| Priority | 1 | 2 | 3 | 3 | 3 | 4 |

The transmission gap pattern includes a first transmission gap 502, a second transmission gap 503 and a third transmission gap 504. The first transmission gap 502 is specified for carrying out measurements of measurement types 1, 2 and 6, the second transmission gap 503 is specified for carrying out measurements according to measurement types 3 and 4 and the third transmission gap 504 is specified for carrying out measurements according to measurement type 5.

The first transmission gap 502 includes time slots of radio frames with numbers 0 and 1, the second transmission gap 503 includes time slots of radio frames with numbers 4 and 5 and the third transmission gap 504 includes time slots of radio frames with numbers 8 and 9. Illustratively, the transmission gaps for measurements of measurement types 1, 2 and 6 overlap and the transmission gaps for measurements of types 3 and 4 overlap.

For example, let at the beginning of the first transmission gap 502 the status of the measurements according to types 1, 2, 6 be:

Type 1: $N_{mess}=6$
Type 2: $N_{mess}=2$
Type 6: $N_{mess}=3$.

It assumed that the mobile terminal 103 has only one receiver and that the measurement of each of the measurement types 1, 2 and 6 takes so much time that only one measurement of the types 1, 2 and 6 can be performed during the first transmission gap 502. In this example, according to table 2, the priority of the measurement type 1 is the highest priority among the measurement types 1, 2, and 6 such that the mobile terminal 103 would, for example, choose to perform a measurement of measurement type 1. However, the mobile terminal 103 may take into account that for measurement type 1 the minimum number of measurements to be performed until reporting has already been reached and may choose to carry out a measurement according to measurement type 2 for which the minimum number of measurements to be carried out until reporting has not been reached and which has a higher priority than measurement type 6.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus to be implemented in a user equipment (UE) adapted to communicate in a Long Term Evolution (LTE) network, the apparatus comprising:
    receiver circuitry to receive a message to include a measurement configuration, wherein the measurement configuration is to indicate:
        a measurement gap configuration, wherein the measurement gap configuration is to indicate a measurement gap pattern, and the measurement gap pattern is to indicate a measurement gap with a constant duration during which a measurement is to be performed, and
        at least two measurement types of a plurality of measurement types to be performed in a corresponding measurement gap, wherein the plurality of measurement types comprises:
            a reference signal received power (RSRP) intra-frequency measurement of at least one evolved Universal Mobile Telecommunications Service (UMTS) Terrestrial Radio Access Network (E-UTRAN) carrier frequency,
            an RSRP inter-frequency measurement of at least one E-UTRAN Frequency Division Duplex (FDD) or Time Division Duplex (TDD) carrier frequency,
            a reference signal received quality (RSRQ) inter-frequency measurement of the at least one E-UTRAN FDD or the TDD carrier frequency
            an RSRP measurement of at least one UMTS Terrestrial Radio Access Network (UTRAN) carrier frequency,
            an RSRQ measurement of the at least one UTRAN carrier frequency,
            a Received Signal Strength Indicator (RSSI) or base station identity code (BSIC) measurement of at least one GMS EDGE Radio Access Network (GERAN) carrier frequency, and
            a pilot channel signal strength measurement of at least one Code Division Multiple Access (CDMA) 2000 carrier frequency; and
        processing circuitry coupled with the receiver circuitry, the processing circuitry to control measurement of carriers of the at least two measurement types of the plurality of measurement types using a same measurement gap pattern of the measurement gap configuration.

2. The apparatus of claim 1, wherein the processing circuitry is to identify one or more cells of the at least two measurement types for the measurement of the carriers in the measurement gap.

3. The apparatus of claim 1, wherein the plurality of measurement types include one or more inter-Radio Access Technology (RAT) measurements, wherein the one or more inter-RAT measurements include the RSRP or RSRQ measurement of the at least one UTRAN carrier frequency, the RSSI or BSIC measurement of the at least one GERAN carrier frequency, and the pilot channel signal strength measurement of the at least one CDMA2000 carrier frequency.

4. The apparatus of claim 1, wherein the plurality of measurement types comprise:
    measurement of three FDD E-UTRAN inter-frequency carriers,
    measurement of three TDD E-UTRAN inter-frequency carriers, measurement of three TDD UTRAN carriers,
measurement of three FDD UTRAN carriers,
measurement of UTRAN Frequency Division Duplex (FDD) common pilot channel (CPICH),
measurement of thirty two Global System for Mobile Communications (GSM) carriers,
measurement of five CDMA2000 carriers, or
measurement of seven carrier frequency layers comprising a combination of the E-UTRAN FDD, the E-UTRAN TDD, the UTRAN FDD, the UTRAN TDD, the GSM, and the CDMA2000 carriers.

5. The apparatus of claim 1, wherein the measurement gap pattern indicates a measurement gap length in milliseconds and the processing circuitry is to determine a starting subframe for when the measurement gap is to start based on information included in the measurement gap configuration.

6. The apparatus of claim 1, wherein the apparatus further comprises:
transmitter circuitry to transmit a measurement report to a base station,
wherein the processing circuitry is to generate the measurement report to include results based on the measurement of one or more carriers of the at least two measurement types.

7. One or more non-transitory computer-readable media (NTCRM) comprising executable instructions, wherein the instructions, in response to execution by a user equipment (UE), cause the UE to:
control receipt of a message, the message to include a measurement configuration, the measurement configuration to include:
a measurement gap configuration to indicate a measurement gap pattern, the measurement gap pattern to indicate a measurement gap during which a plurality of measurements are to be performed,
wherein the measuremebt gap pattern is to indicate a measurement gap with a constant duation during which a measurement is to be performed, and
at least two measurement types of a plurality of measurement types to be used to perform one or more measurements, wherein the plurality of measurement types comprise:
a reference signal received power (RSRP) intra-frequency measurement of at least one evolved Universal Mobile Telecommunications Service (UMTS) Terrestrial Radio Access Network (E-UTRAN) carrier frequency,
an RSRP inter-frequency measurement of the at least one E-UTRAN Frequency Division Duplex (FDD) or Time Division Duplex (TDD) carrier frequency,
a reference signal received quality (RSRQ) inter-frequency measurement of the at least one E-UTRAN FDD or TDD carrier frequency
an RSRP measurement of at least one UMTS Terrestrial Radio Access Network (UTRAN) carrier frequency,
an RSRQ measurement of the at least one UTRAN carrier frequency,
a Received Signal Strength Indicator (RSSI) or base station identity code (BSIC) measurement of at least one GMS EDGE Radio Access Network (GERAN) carrier frequency, and
a pilot channel signal strength measurement of at least one Code Division Multiple Access (CDMA) 2000 carrier frequency; and
control measurement of one or more carriers of the at least two measurement types during the measurement gap indicated by the measurement gap configuration.

8. The one or more NTCRM of claim 7, wherein the execution of the instructions is to cause the UE to:
generate a measurement report comprising results of the measurements performed in the measurement gap; and
control transmission of the measurement report to a base station.

9. The one or more NTCRM of claim 7, wherein the plurality of measurement types include inter-Radio Access Technology (RAT) measurements, wherein one or more inter-RAT measurements include the RSRP or RSRQ measurement of the at least one UTRAN carrier frequency, the RSSI or BSIC measurement of the at least one GERAN carrier frequency, and the pilot channel signal strength measurement of the at least one CDMA2000 carrier frequency.

10. The one or more NTCRM of claim 7, wherein the plurality of measurements comprises measurement of three FDD E-UTRAN inter-frequency carriers, measurement of three TDD E-UTRAN inter-frequency carriers, measurement of three TDD UTRAN carriers, measurement of three FDD UTRAN carriers, measurement of UTRAN Frequency Division Duplex (FDD) common pilot channel (CPICH), measurement of thirty two Global System for Mobile Communications (GSM) carriers, measurement of five CDMA2000 carriers, or measurement of seven carrier frequency layers comprising a combination of the E-UTRAN FDD, the E-UTRAN TDD, the UTRAN FDD, the UTRAN TDD, the GSM, and the CDMA2000 carriers.

11. The one or more NTCRM of claim 7, wherein the execution of the instructions is to cause the UE to determine one or more cells to be measured.

12. The one or more NTCRM of claim 7, wherein the measurement gap pattern comprises a measurement gap length in milliseconds, and wherein the execution of the instructions is to cause the UE to determine a starting subframe for when the measurement gap is to start based on information included in the message.

13. One or more non-transitory computer-readable media (NTCRM) comprising executable instructions, wherein the instructions, in response to execution by a user equipment (UE), cause the UE to:
control receipt of a message indicating a measurement configuration, wherein the measurement configuration indicates:
a measurement gap configuration, the measurement gap configuration to indicate a measurement gap pattern comprising a measurement gap with a constant measurement duration in milliseconds, and
at least two measurement types of a plurality of measurement types to be used to measure one or more frequency carriers, wherein the plurality of measurement types comprises:
a reference signal received power (RSRP) intra-frequency measurement of at least one evolved Universal Mobile Telecommunications Service (UMTS) Terrestrial Radio Access Network (E-UTRAN) carrier frequency,
an RSRP inter-frequency measurement of the at least one E-UTRAN Frequency Division Duplex (FDD) or Time Division Duplex (TDD) carrier frequency,
a reference signal received quality (RSRQ) inter-frequency measurement of at least one E-UTRAN FDD or TDD carrier frequency
an RSRP measurement of at least one UMTS Terrestrial Radio Access Network (UTRAN) carrier frequency,
an RSRQ measurement of the at least one UTRAN carrier frequency, a Received Signal Strength Indicator (RSSI) or base station identity code (BSIC) measurement of at least one GMS EDGE Radio Access Network (GERAN) carrier frequency, and a pilot channel signal strength measurement of at least one Code Division Multiple Access (CDMA) 2000 carrier frequency;

control measurement, during each measurement gap of a plurality of measurement gaps, of one or more carriers of the at least two measurement types of the plurality of measurement types;

generate a measurement report to include measurement information, wherein the measurement information is based on the measurement of the one or more carriers; and control transmission of the measurement report to a base station adapted to communicate in a Long Term Evolution (LTE) network.

14. The one or more NTCRM of claim 13, wherein the plurality of measurement types comprises inter-Radio Access Technology (RAT) measurements, wherein one or more inter-RAT measurements include the RSRP or RSRQ measurement of the at least one UTRAN carrier frequency, the RSSI or BSIC measurement of the at least one GERAN carrier frequency, and the pilot channel signal strength measurement of the at least one CDMA2000 carrier frequency.

15. The one or more NTCRM of claim 13, wherein the plurality of measurements comprise measurement of three FDD E-UTRAN inter-frequency carriers, measurement of three TDD E-UTRAN inter-frequency carriers, measurement of three TDD UTRAN carriers, measurement of three FDD UTRAN carriers, measurement of UTRAN Frequency Division Duplex (FDD) common pilot channel (CPICH), measurement of thirty two Global System for Mobile Communications (GSM) carriers, measurement of five CDMA2000 carriers, or measurement of seven carrier frequency layers comprising a combination of the E-UTRAN FDD, the E-UTRAN TDD, the UTRAN FDD, the UTRAN TDD, the GSM, and the CDMA2000 carriers.

16. An apparatus to be implemented in a base station adapted to communicate in a Long Term Evolution (LTE) network, the apparatus comprising:

processing circuitry to generate a measurement configuration to include a measurement gap configuration and at least two measurements types of a plurality of measurement types, wherein:

the measurement gap configuration is to indicate a measurement gap pattern, the measurement gap pattern to indicate a measurement gap with a constant duration which a user equipment (UE) is to perform measurements of the at least two measurement types, and the plurality of measurement types comprise:

a reference signal received power (RSRP) intra-frequency measurement of at least one evolved Universal Mobile Telecommunications Service (UMTS) Terrestrial Radio Access Network (E-UTRAN) carrier frequency, an RSRP inter-frequency measurement of the at least one E-UTRAN Frequency Division Duplex (FDD) or Time Division Duplex (TDD) carrier frequency, a reference signal received quality (RSRQ) inter-frequency measurement of the at least one E-UTRAN FDD or TDD carrier frequency an RSRP measurement of at least one UMTS Terrestrial Radio Access Network (UTRAN) carrier frequency, an RSRQ measurement of the at least one UTRAN carrier frequency, a Received Signal Strength Indicator (RSSI) or base station identity code (BSIC) measurement of at least one GMS EDGE Radio Access Network (GERAN) carrier frequency, and a pilot channel signal strength measurement of at least one Code Division Multiple Access (CDMA) 2000 carrier frequency; and transmitter circuitry communicatively coupled with the processing circuitry, the transmitter circuitry to transmit, to the UE, a message including the measurement gap configuration.

17. The apparatus of claim 16, wherein the plurality of measurement types comprise inter-radio access technology (RAT) measurements or inter-frequency measurements.

18. The apparatus of claim 17, wherein the plurality of measurements comprise the Reference Signal Received Power (RSRP) measurements, the Reference Signal Received Quality (RSRQ) measurements, the Universal Mobile Telecommunications Systems (UMTS) Terrestrial Radio Access Network (UTRAN) measurements, the UTRAN Frequency Division Duplex (FDD) measurements, or the received signal strength indicator (RSSI) measurements of a Global System for Mobile Communications (GSM) carrier.

19. The apparatus of claim 16, wherein the apparatus further comprises:

receiver circuitry to receive a measurement report from the UE, wherein the measurement report is to include information based on the performed measurements.

20. An integrated circuit (IC) to be implemented in a user equipment (UE) adapted to communicate in a Long Term Evolution (LTE) network, the IC comprising:

baseband processing circuitry and memory circuitry, the baseband processing circuitry to:

identify, based on a received message, a measurement gap configuration and a plurality of measurement types, wherein the measurement gap configuration is to indicate a measurement gap pattern, the measurement gap pattern to indicate a measurement gap with a constant duration, and wherein one or more measurement types of the plurality of measurement types are to be performed in the measurement gap; and control measurement of a set of carriers using the plurality of measurement types during a time slot of the measurement gap, wherein the plurality of measurement types comprises:

a reference signal received power (RSRP) intra-frequency measurement of at least one evolved Universal Mobile Telecommunications Service (UMTS) Terrestrial Radio Access Network (E-UTRAN) carrier frequency, an RSRP inter-frequency measurement of at the least one E-UTRAN Frequency Division Duplex (FDD) or Time Division Duplex (TDD) carrier frequency, a reference signal received quality (RSRQ) inter-frequency measurement of at least one E-UTRAN FDD or TDD carrier frequency, an RSRP measurement of at least one UMTS Terrestrial Radio Access Network (UTRAN) carrier frequency, an RSRQ measurement of the at least one UTRAN carrier frequency, a Received Signal Strength Indicator (RSSI) or base station identity code (BSIC) measurement of at least one GMS EDGE Radio Access Network (GERAN) carrier frequency, and a pilot channel signal strength measurement of at least one Code Division Multiple Access (CDMA) 2000 carrier frequency.

21. The IC of claim 20, wherein the baseband processing circuitry is to determine the one or more measurement types from the plurality of measurement types for measurement of the set of carriers in the measurement gap.

22. The IC of claim 20, wherein the plurality of measurement types include one or more inter-frequency measurements or one or more inter-radio access technology (RAT) measurements.

23. The IC of claim 20, wherein the plurality of measurement types comprise:
   measurement of three FDD E-UTRAN inter-frequency carriers,
   measurement of three FDD E-UTRAN inter-frequency carriers,
   measurement of three FDD UTRAN carriers,
   measurement of three FDD UTRAN carriers,
   measurement of one or more UTRAN FDD common pilot channels (CPICH), or
   measurement of thirty two GSM carriers,
   measurement of five CDMA2000 carriers, or
   measurement of seven carrier frequency layers comprising a combination of the E-UTRAN FDD, the E-UTRAN TDD, the UTRAN FDD, the UTRAN TDD, the GSM, and the CDMA2000 carriers.

24. The IC of claim 20, wherein the measurement gap pattern indicates a measurement gap length in milliseconds and the baseband processing circuitry is to determine a starting subframe for when the measurement gap is to start based on information included in the measurement gap configuration.

25. The IC of claim 20, wherein the baseband processing circuitry is to:
   generate a measurement report to include results based on the measurement of one or more carriers of the plurality of measurement types; and
   control transmission of the measurement report to a base station.

* * * * *

UNITED STATES PATENT AND TRADEMARK OFFICE
CERTIFICATE OF CORRECTION

PATENT NO. : 10,200,896 B2  
APPLICATION NO. : 15/428492  
DATED : February 5, 2019  
INVENTOR(S) : Hyung-Nam Choi et al.

Page 1 of 3

It is certified that error appears in the above-identified patent and that said Letters Patent is hereby corrected as shown below:

On the Title Page

Below Abstract replace: "25 Claims, 3 Drawing Sheets" with --21 Claims, 3 Drawing Sheets--

In the Claims

Column 10  
    Line 31, insert --,-- after --frequency--

Column 11  
    Line 36, replace: "wherein the measuremebt" with --wherein the measurement--

Column 12  
    Line 63, insert --,-- after --frequency--

Column 13  
    Line 46, replace: "two measurements types" with --two measurement types--

Column 13  
    Line 65, insert --,-- after --frequency--

Column 15  
    Line 16, replace: "FDD E-UTRAN" with --TDD E-UTRAN--

Column 15  
    Line 18, replace: "FDD UTRAN" with --TDD UTRAN--

Column 10  
    Lines 53-63, Claim 3 should have been previously cancelled Signed and Sealed this  
Eighteenth Day of June, 2019

Andrei Iancu  
*Director of the United States Patent and Trademark Office*

Column 12
Lines 7-15, Claim 9 should have been previously cancelled

Column 14
Lines 14-26, Claims 17 and 18 should have been previously cancelled

Column 10
Line 62, Claim 4 should be re-numbered as Claim 3

Column 11
Line 12, Claim 5 should be re-numbered as Claim 4

Column 11
Line 17, Claim 6 should be re-numbered as Claim 5

Column 11
Line 25, Claim 7 should be re-numbered as Claim 6

Column 12
Line 1, Claim 8 should be re-numbered as Claim 7

Column 12
Line 16, Claim 10 should be re-numbered as Claim 8

Column 12
Line 29, Claim 11 should be re-numbered as Claim 9

Column 12
Line 32, Claim 12 should be re-numbered as Claim 10

Column 12
Line 38, Claim 13 should be re-numbered as Claim 11

Column 13
Line 19, Claim 14 should be re-numbered as Claim 12

Column 13
Line 28, Claim 15 should be re-numbered as Claim 13

Column 13
Line 41, Claim 16 should be re-numbered as Claim 14

Column 14
Line 27, Claim 19 should be re-numbered as Claim 15

CERTIFICATE OF CORRECTION (continued)
U.S. Pat. No. 10,200,896 B2

Column 14
Line 32, Claim 20 should be re-numbered as Claim 16

Column 15
Line 4, Claim 21 should be re-numbered as Claim 17

Column 15
Line 8, Claim 22 should be re-numbered as Claim 18

Column 15
Line 12, Claim 23 should be re-numbered as Claim 19

Column 16
Line 7, Claim 24 should be re-numbered as Claim 20

Column 16
Line 13, Claim 25 should be re-numbered as Claim 21

Column 14
Line 54, replace: "of at the least" by --of at least--